United States Patent
Wu

(10) Patent No.: US 8,419,290 B2
(45) Date of Patent: Apr. 16, 2013

(54) OPTICAL FIBER FIXING DEVICE AND METHOD FOR ASSEMBLING OPTICAL FIBER TO OPTICAL CONNECTOR USING SAME

(75) Inventor: Kun-Chan Wu, Taipei-Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 12/869,762

(22) Filed: Aug. 27, 2010

(65) Prior Publication Data
US 2011/0211791 A1 Sep. 1, 2011

(30) Foreign Application Priority Data
Mar. 1, 2010 (TW) ................................ 99105884 A

(51) Int. Cl.
*G02B 6/36* (2006.01)
*G02B 6/00* (2006.01)

(52) U.S. Cl.
USPC ........................................... 385/53; 385/136

(58) Field of Classification Search ................. None
See application file for complete search history.

(56) References Cited

U.S. PATENT DOCUMENTS

| | | | | |
|---|---|---|---|---|
| 6,212,324 B1 * | 4/2001 | Lin et al. | ...... | 385/136 |
| 6,758,603 B2 * | 7/2004 | Yang | ...... | 385/78 |
| 6,953,285 B2 * | 10/2005 | Mickievicz | ...... | 385/56 |
| 7,500,790 B2 * | 3/2009 | Erdman et al. | ...... | 385/75 |
| 7,621,676 B2 * | 11/2009 | Nakagawa et al. | ...... | 385/81 |

* cited by examiner

*Primary Examiner* — Tina Wong
(74) *Attorney, Agent, or Firm* — Altis Law Group, Inc.

(57) ABSTRACT

An optical fiber fixing device for fixing optical fibers in an optical connector includes a supporting arm, two connecting arms, and a pressing arm. The supporting arm includes a first end and an opposite second end. The connecting arms respectively extend from the first end and the second end toward a same direction. The connecting arms are configured for insertion into the optical connector. The pressing arm extends from the supporting arm between the connecting arms. The pressing arm is configured for pressing the optical fibers onto the optical connector.

16 Claims, 6 Drawing Sheets

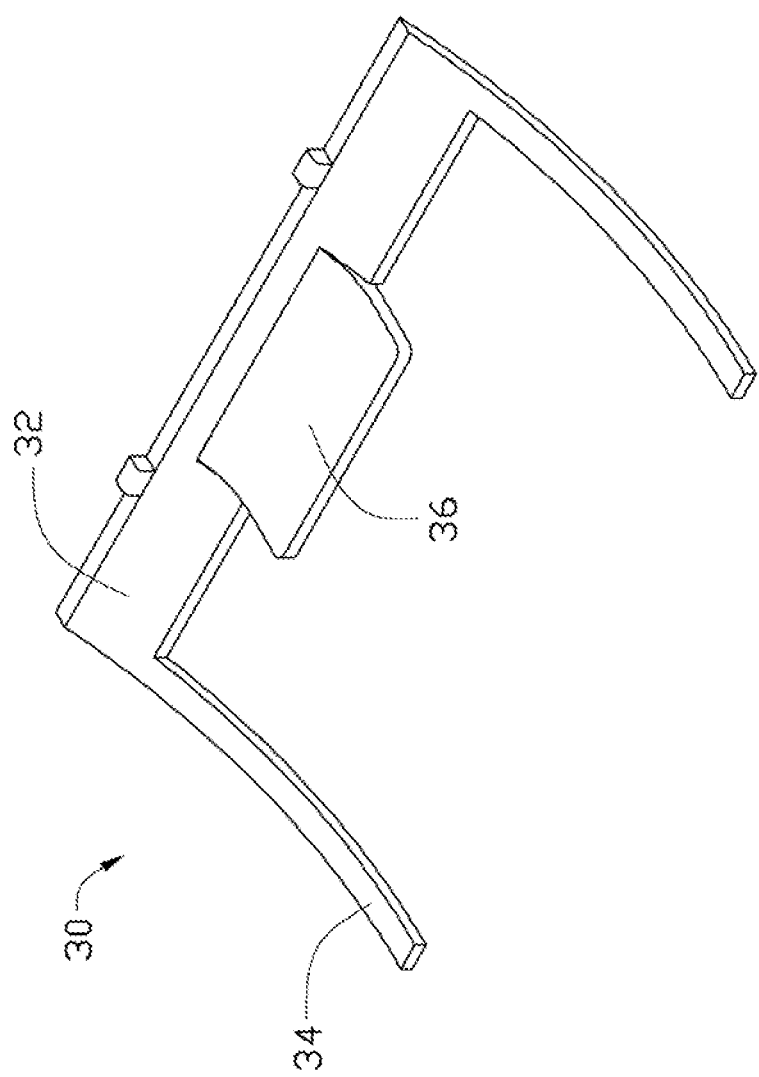

OPTICAL FIBER FIXING DEVICE AND METHOD FOR ASSEMBLING OPTICAL FIBER TO OPTICAL CONNECTOR USING SAME

CROSS-REFERENCE TO RELATED APPLICATIONS

This application is related to a commonly-assigned copending application Ser. No. 12/822,192, entitled "OPTICAL FIBER CONNECTOR". Disclosure of the above-identified applications is incorporated herein by reference.

BACKGROUND

1. Technical Field

The present disclosure relates to optical technology and, particularly, to an optical fiber fixing device and a method for assembling optical fibers to an optical connector using the optical fiber fixing device.

2. Description of Related Art

Currently, optical connectors are preferred for use in data transmission between electronic devices due to their high transmission speed and signal integrity. Generally, an optical connector includes a plurality of blind holes for exactly receiving optical fibers and a plurality of lenses corresponding to the optical fibers. When the optical connector is assembled, each optical fiber is inserted into a corresponding blind hole in front of a corresponding lens and fixed in a predetermined position by ultraviolet-curable glue after an ultraviolet-curing process.

However, during the ultraviolet-curing process, the optical fibers are easily moved or deviated from alignment inadvertently by the operator's handling. Optical signals from the optical fibers enter into the lenses. If the optical fibers are moved, the optical fibers cannot be fixed in the predetermined position in front of the corresponding lens. As a result, the transmission accuracy and efficiency of the optical connectors decreases.

Therefore, it is desirable to provide an optical fiber fixing device and a method for assembling optical fibers to an optical connector using the optical fiber fixing device, which can overcome or at least alleviate the above-mentioned problems.

BRIEF DESCRIPTION OF THE DRAWINGS

FIG. 6 is a schematic, isometric view of an optical fiber fixing device, according to a second exemplary embodiment.

DETAILED DESCRIPTION

Figure 1:
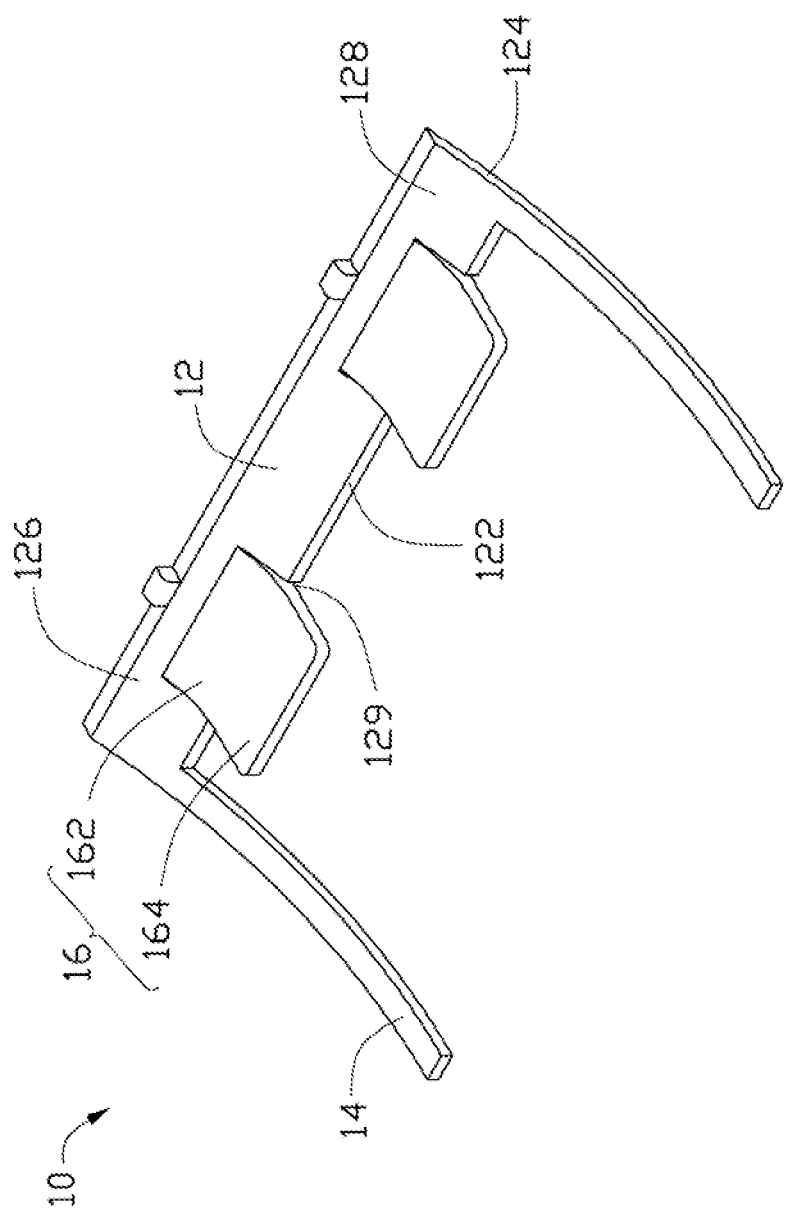
FIG. 1 is a schematic, isometric view of an optical fiber fixing device, according to a first exemplary embodiment.
Figure 2:
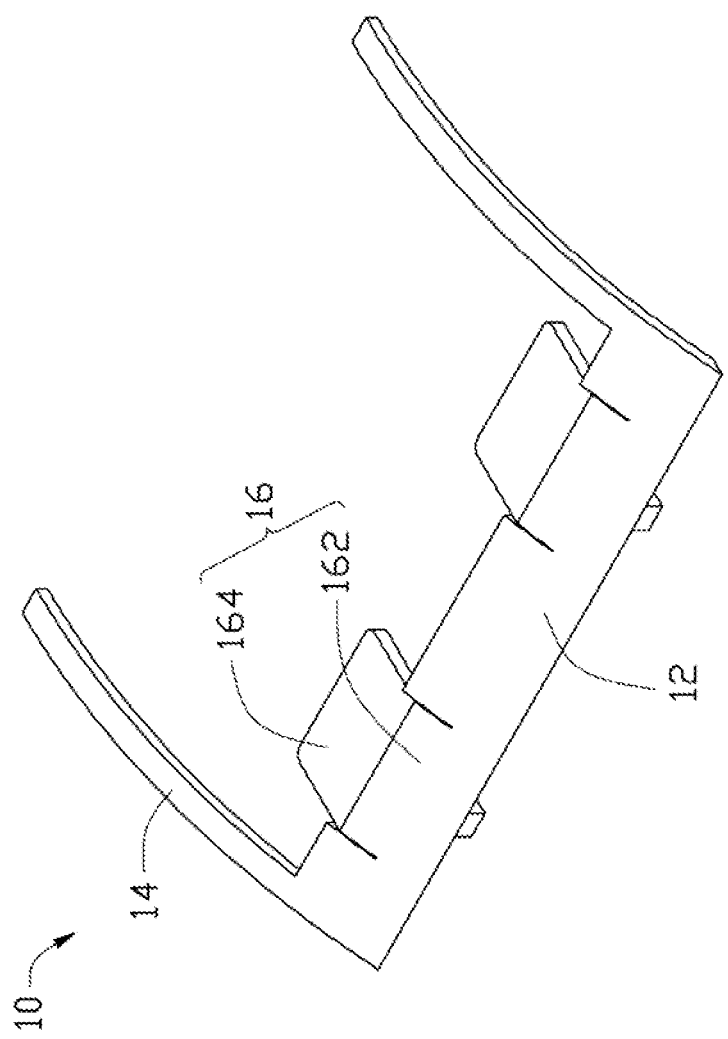
FIG. 2 is similar to FIG. 1, but viewed from another aspect.

Referring to FIGS. 1-2, an optical fiber fixing device 10, according to a first exemplary embodiment, includes a supporting arm 12, two connecting arms 14, and two pressing arms 16.

The supporting arm 12 is elongated and has an arc-shaped profile. The supporting arm 12 includes two opposite long sides 122 and two opposite short sides 124. The supporting arm 12 includes a first end 126 and a second end 128 along a lengthwise direction of the supporting arm 12. The first end 126 and the second end 128 are at opposite sides of the supporting arm 12. Two cutouts 129 are defined in the supporting arm 12 along the lengthwise direction of the supporting arm 12. The two cutouts 129 are spaced apart from each other and are located between the first end 126 and the second end 128.

The two connecting arms 14 are elongated cuboid and extend from the first end 126 and the second end 128 respectively. The connecting arms 14 may be perpendicular to one of the long sides 122. Each connecting arm 14 has an arc-shaped profile and smoothly extends from the supporting arm 12. In this embodiment, the two connecting arms 14 are integrally formed with the supporting arm 12.

The two pressing arms 16 conform to the two cutouts 129. Each pressing arm 16 includes a connecting portion 162 and a pressing portion 164 extending from and distinctly oriented from the connecting portion 162. The connecting portion 162 is located in a corresponding cutout 129 and has a smooth arc similar to the supporting arm 12. The pressing portion 164 is located outside the corresponding cutout 129. In this embodiment, the two pressing arms 16 are integrally formed with the supporting arm 12.

In other embodiments, the two pressing arms 16, the two connecting arms 14 may be separately formed with the supporting arm 12.

Figure 3:
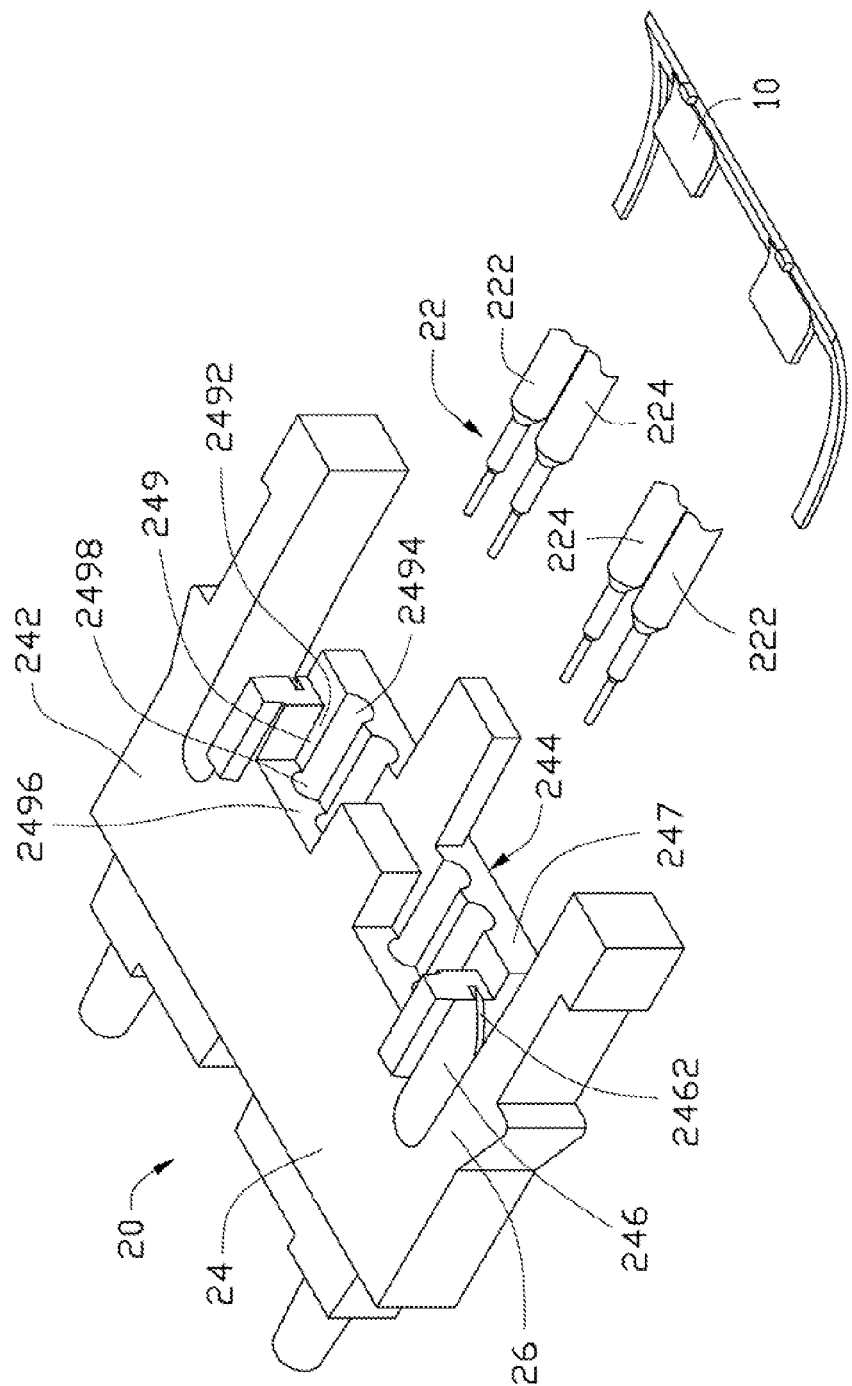
FIG. 3 shows the optical fiber fixing device of FIG. 1 in a first state of being uncoupled to an optical connector.
Figure 4:
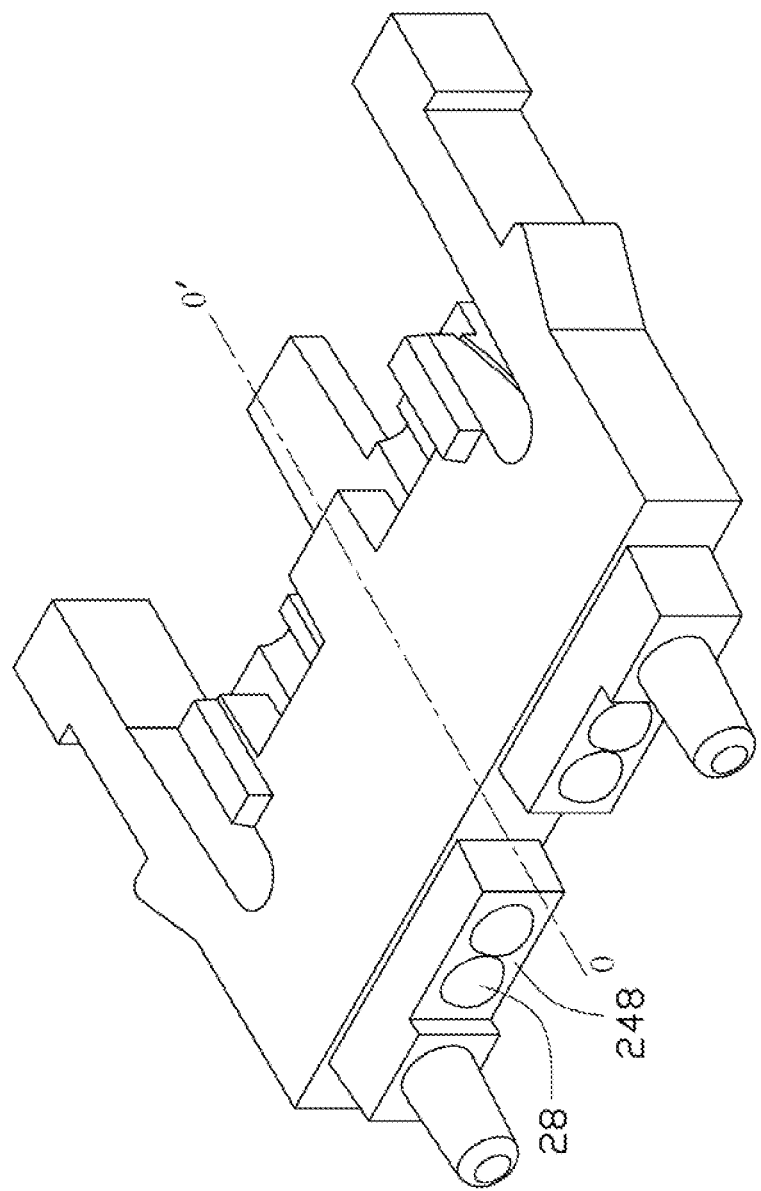
FIG. 4 is a schematic, isometric view of the optical connector of FIG. 3, but viewed from another aspect.
Figure 5:
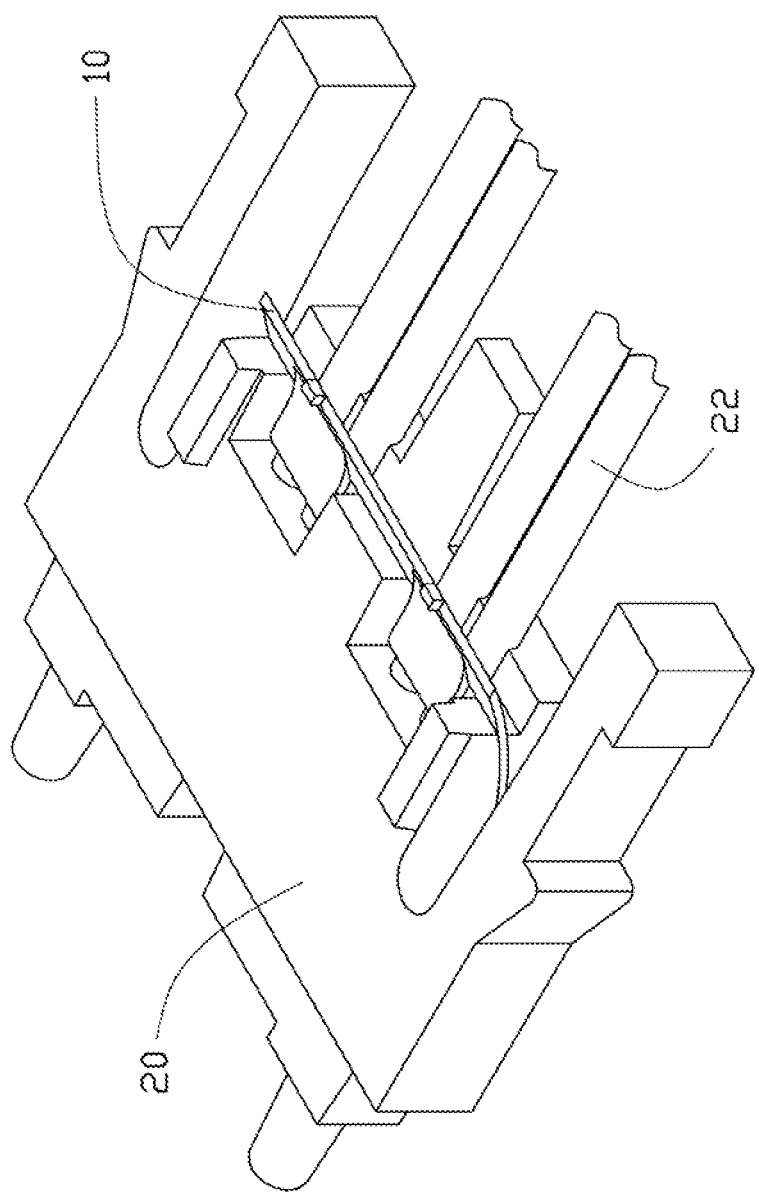
FIG. 5 shows the optical fiber fixing device of FIG. 1 in a second state of being coupled to the optical connector of FIG. 3.

Referring to FIG. 3, the optical fiber fixing device 10 for assembling four optical fibers 22 to an optical connector 20 in a first state, being uncoupled to the optical connector 20, is shown. Referring to FIGS. 4-5, the four optical fibers 22 include two output optical fibers 222 and two input optical fibers 224 each parallel to the respective output optical fiber 222. In addition, the two input optical fibers 224 are positioned between the two output optical fibers 222.

The optical connector 20 includes a body portion 24, two grips 26, and four lenses 28.

The body portion 24 is approximately cuboid and defines a central axis OO'. The body portion 24 includes an upper surface 242, a lower surface 244, two side surfaces 246, a back surface 247, and two transmitting surfaces 248. The upper surface 242 is opposite and parallel to the lower surface 244. The two side surfaces 246 are opposite and parallel to each other. The two transmitting surfaces 248 are in a common plane and spaced apart from each other. The two transmitting surfaces 248 are opposite and parallel to the back surface 247. The two side surfaces 246, the two transmitting surfaces 248, and the back surface 247 connect the upper surface 242 to the lower surface 244. The two side surfaces 246, the two transmitting surfaces 248, and the back surface 247 perpendicularly connect each other end-to-end.

Two grooves 249 are defined on the upper surface 242. The two grooves 249 are symmetric relative to the central axis OO' and correspond to the two transmitting surfaces 248, respectively. Two recesses 2494 are defined in a bottom 2492 of each groove 249. Two blind holes 2498 corresponding to the two recesses 2494 are defined in a sidewall 2496 of each groove 249. Each recess 2494 communicates with a corresponding blind hole 2498. The optical fibers 22 are supported by the recesses 2494 and are partially received in the blind holes 2498.

Each grip 26 extends from a front portion of each sidewall 246. Two insertion slots 2462 are defined in a back portion of the sidewalls 246 corresponding to the connecting arms 14. The insertion slots 2462 are exposed at the sidewalls 246. The grips 26 are configured for being held when the optical fibers 22 are inserted into the blind holes 2498, or when the optical connector 20 is electrically connected to electronic device.

The four lenses 28 are fixed in the transmitting surfaces 248 in front of the optical fibers 22. The four lenses 28 are symmetric relative to the central axis OO'. The lenses 28 are configured for guiding optical signals. When the optical connector 20 is used as an output terminal, the lenses 28 are used to collimate output optical signals from the optical fibers 22. When the optical connector 20 is used as an input terminal, the lenses 28 are used to focus input optical signals into the optical fibers 22.

When the optical fibers 22 are inserted into the corresponding blind holes 2498, the optical fibers 22 are positioned in a predetermined position in front of the corresponding lenses 28. Each optical fiber 22 is partially received in a corresponding blind hole 2498 and is supported by a corresponding recess 2494. Then, the two connecting arms 14 are inserted into the corresponding insertion slot 2462 so that the optical fiber fixing device 10 is connected to the optical connector 20 and the pressing arms 16 press the optical fibers 22. Finally, ultraviolet-curable glue (not shown) is dropped into the recesses 2494 and is cured by ultraviolet radiation for a required duration. The optical fibers 22 are then fixed in the recesses 2494 by the ultraviolet-curable glue. Therefore, during the ultraviolet-curing process, the optical fibers 22 are immobilized and cannot move under the pressure of the pressing arms 16 and can be fixed in the predetermined position in front of the corresponding lens 28. This increases the transmission accuracy and efficiency of the optical connector. Further, the optical fiber fixing device 10 can be removed from the optical connector 20 after the glue is cured by pulling the two connecting arms 14 out of the corresponding insertion slots 2462.

Referring to FIG. 6, an optical fiber fixing device 30, according to a second embodiment, is shown. The differences between the optical fiber fixing device 30 of this embodiment and the optical fiber fixing device 10 of the first embodiment is: the optical fiber fixing device 30 includes a supporting arm 32, two connecting arms 34, and a pressing arm 36. The supporting arm 32 and the connecting arms 34 are the same of the supporting arm 12 and the connecting arm 14 of the first embodiment. The pressing arm 36 extends from a middle portion of the supporting arm 32 along a lengthwise direction of the connecting arms 34.

The advantages of the optical fiber fixing device 30 of the second embodiment are similar to those of the optical fiber fixing device 10 of the first embodiment. Further, in the second embodiment, the optical fiber fixing device 30 is configured to secure the optical fibers 22 in the middle of the optical connector 20 whereas in the first embodiment they are secured separately.

It is to be understood, however, that even though numerous characteristics and advantages of the present embodiments have been set forth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An optical fiber fixing device for fixing optical fibers in an optical connector, comprising:
    a supporting arm comprising a first end and an opposite second end, at least one cutout defined in the supporting arm along a lengthwise direction of the supporting arm, the at least one cutout located between the first end and the second end;
    two connecting arms respectively extending from the first end and the second end toward a same direction, the connecting arms configured for insertion into the optical connector; and
    at least one pressing arm extending from the supporting arm in the at least one cutout, the at least one pressing arm configured for pressing the optical fibers onto the optical connector and comprising a connecting portion and a pressing portion extending from and distinctly oriented from the connecting portion, the connecting portion located in the corresponding cutout, and the pressing portion located outside the corresponding cutout.

2. The optical fiber fixing device as claimed in claim 1, wherein the supporting arm has an arc-shaped profile, the supporting arm comprises two opposite long sides and two opposite short sides, and the connecting arms are approximately perpendicular to one of the long sides.

3. The optical fiber fixing device as claimed in claim 2, wherein each connecting arm has an arc-shaped profile and smoothly extends from the supporting arm.

4. The optical fiber fixing device as claimed in claim 1, wherein the two connecting arms are integrally formed with the supporting arm.

5. A method for assembling optical fibers to an optical connector, the optical connector defining a plurality of blind holes, the method comprising:
    providing an optical fiber fixing device, the optical fiber fixing device comprising:
        a supporting arm comprising a first end and an opposite second end;
        two connecting arms respectively extending from the first end and the second end toward a same direction; and
        at least one pressing arm extending from the supporting arm between the two connecting arms;
    inserting optical fibers into the blind holes; and
    inserting the connecting arms into the optical connector, thus the at least one pressing arm pressing the optical fibers onto the optical connector; and
    applying a glue to the optical fibers to fixedly affix the optical fiber to the optical connector.

6. The method as claimed in claim 5, wherein the supporting arm has an arc-shaped profile, and comprises two opposite long sides and two opposite short sides, and the connecting arms are approximately perpendicular to one of the long sides.

7. The method as claimed in claim 6, wherein each connecting arm has an arc-shaped profile and smoothly extends from the supporting arm.

8. The method as claimed in claim 5, wherein the two connecting arms are integrally formed with the supporting arm.

9. The method as claimed in claim 7, wherein at least one cutout is defined in the supporting arm along a lengthwise direction of the supporting arm, the at least one cutout is located between the first end and the second end, and the at least one pressing arm is arranged in the at least one cutout.

10. The method as claimed in claim 9, wherein the at least one pressing arm comprises a connecting portion and a pressing portion extending from and distinctly oriented from the connecting portion, the connecting portion is located in the corresponding cutout, and the pressing portion is located outside the corresponding cutout.

11. An optical fiber fixing device for fixing optical fibers to an optical connector, the optical connector comprising two insertion slots, a plurality of blind holes, and a groove portion, the groove portion having a plurality of grooves defined therein communicating with the respective blind holes, the optical fibers received in the corresponding blind holes and grooves, the optical fiber fixing device comprising:

a supporting arm comprising a first end and an opposite second end;

two connecting arms respectively extending from the first end and the second end toward a same direction, the connecting arms configured for insertion into the insertion slots of the optical connector; and at least one pressing arm extending from the supporting arm between the connecting arms, the at least one pressing arm configured for securely pressing the optical fibers against the groove portion of the optical connector.

12. The optical fiber fixing device as claimed in claim 11, wherein the supporting arm has an arc-shaped profile, the supporting arm comprises two opposite long sides and two opposite short sides, and the connecting arms are approximately perpendicular to one of the long sides.

13. The optical fiber fixing device as claimed in claim 12, wherein each connecting arm has an arc-shaped profile and smoothly extends from the supporting arm.

14. The optical fiber fixing device as claimed in claim 11, wherein the two connecting arms are integrally formed with the supporting arm.

15. The optical fiber fixing device as claimed in claim 13, wherein at least one cutout is defined in the supporting arm along a lengthwise direction of the supporting arm, the at least one cutout is located between the first end and the second end, and the at least one pressing arm is arranged in the at least one cutout.

16. The optical fiber fixing device as claimed in claim 15, wherein the at least one pressing arm comprises a connecting portion and a pressing portion extending from and distinctly oriented from the connecting portion, the connecting portion is located in the corresponding cutout, and the pressing portion is located outside the corresponding cutout.

* * * * *